March 27, 1934.  L. B. GREEN  1,952,856
MAINTAINED TEMPERATURE LIQUID HEATER
Filed May 20, 1932  2 Sheets-Sheet 1
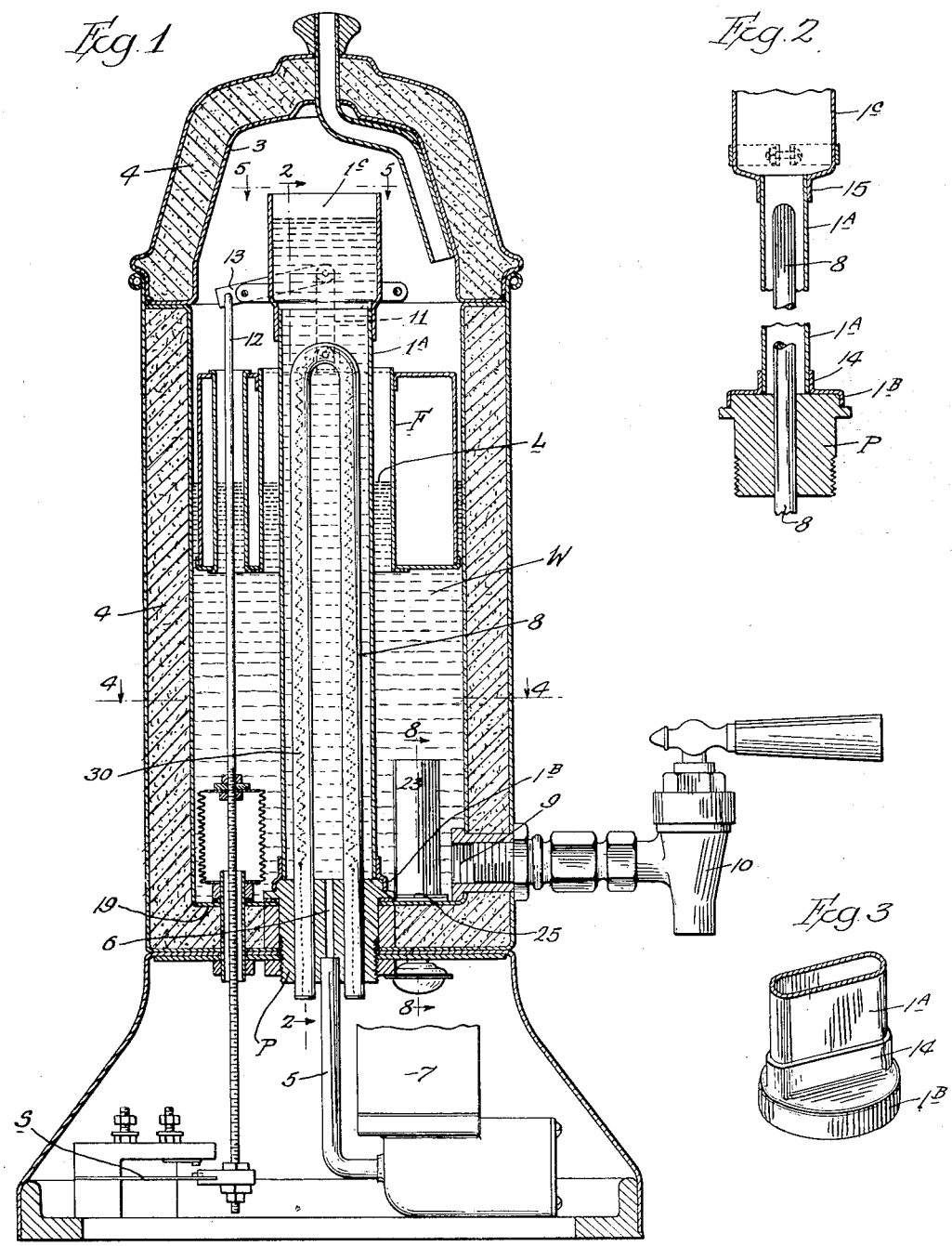
Inventor:
Lee B. Green
by Albert Scheibli
Attorney March 27, 1934. L. B. GREEN 1,952,856
MAINTAINED TEMPERATURE LIQUID HEATER
Filed May 20, 1932 2 Sheets-Sheet 2
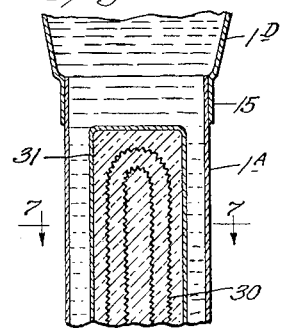
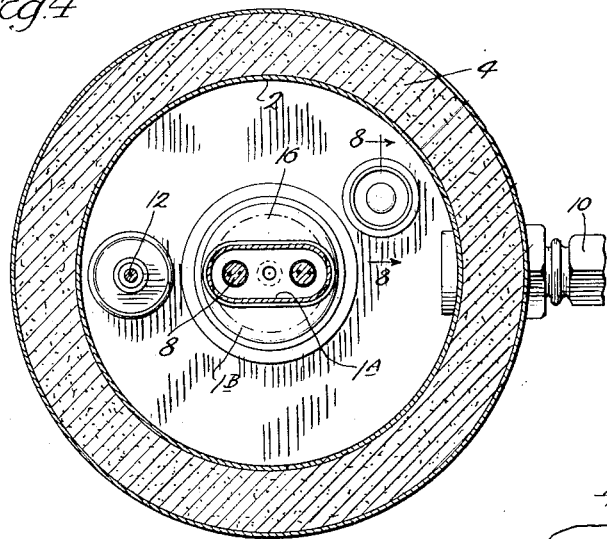
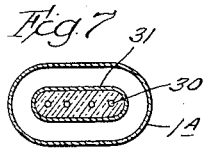
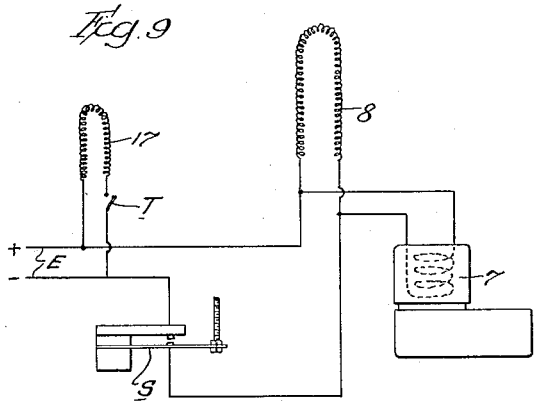
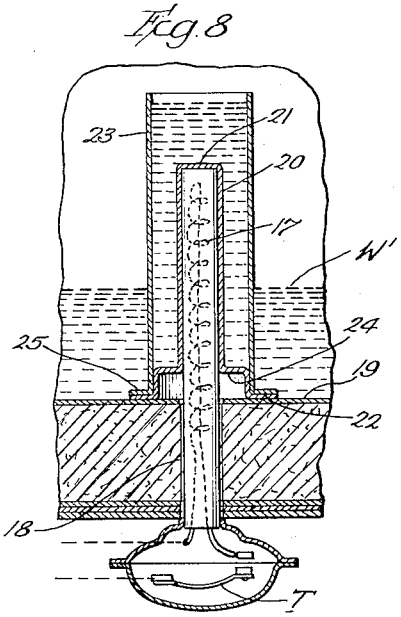
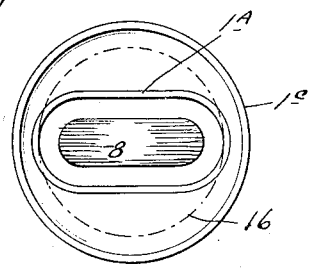
Inventor:
Lee B. Green
by Albert Scheibli
Attorney Patented Mar. 27, 1934

1,952,856

UNITED STATES PATENT OFFICE 1,952,856

MAINTAINED TEMPERATURE LIQUID HEATER

Lee B. Green, Lakewood, Ohio, assignor to The Globe Machine & Stamping Company, Cleveland, Ohio, a corporation of Ohio Application May 20, 1932, Serial No. 612,531

15 Claims. (Cl. 219—38)

My invention relates to the class of liquid heaters in which the liquid is heated while flowing upwardly past a heating member immersed in the liquid, and more particularly to a liquid heating appliance in which the heated liquid is thereafter stored to afford an instantly available supply of hot liquid.

In one of its general objects, my invention aims to construct an upright duct through which the liquid flows past the heating member so as to reduce the volume of water contiguous to the heating member, in proportion to the cross-sectional dimensions of that member, thereby increasing the rate at which a heating member of given capacity will heat the liquid.

In a further aspect, my invention relates to means for maintaining the temperature of the stored hot liquid substantially constant, so as to offset loss of heat by radiation to the outer air. In this respect my invention aims to provide means whereby an immersion type of heating member may be employed with high effectiveness for this temperature maintaining without having that heating member burn out when the store of hot liquid is temporarily exhausted, and whereby a heating member may be employed for this purpose even when it does not have a waterproof casing.

More particularly, my invention relates to a liquid heater in which liquid is boiled by electrical means within a riser tube and in which the boiled water is thereafter stored as a hot liquid in a container which houses the riser tube, an appliance of this class having been previously disclosed in my application # 600,877, filed March 24, 1932 on a Water heater for coffee making.

In the liquid heater of my said copending application, the liquid flows upwardly within a cylindrical riser tube past an electric heating member of inverted U-shape which is entirely immersed in the liquid, and which member has its upper end considerably below the top of the liquid in the riser tube, and the boiled water is thereafter collected in the annular space between the said tube and the bore of a receptacle in which the tube is mounted.

Although commercially advantageous, the liquid heater of this copending application has proven to be short of ideal, for the following reasons:

(1) When a U-shaped heating member is disposed in a cylindrical tube, the spacing of the tube from this member is much greater in directions transverse of the common plane of the axes of the shanks of that member than in a plane along that axis. Consequently, the cross-sectional area of the water opposite any point along one of these shanks is many times greater than the corresponding cross-section through the heating member, so that the heating effect on the water is slowed up accordingly.

(2) Owing to this relatively slow heating and relatively large cross-section of the cooler water in the lower portion of the tube, this part of the water in the tube unduly cools the stored water surrounding the lower part of the tube, thereby undesirably reducing the temperature of the water drawn from the hot-water storing compartment of the appliance.

(3) When the appliance is arranged so that the heating member only receives current during the replenishing of the stored supply of hot water, the intervals between the drawing of water from this store may be so great that radiation of heat to the surrounding air also cools the stored hot water undesirably. While an immersion heater disposed within this stored hot water might compensate for this heat loss, such an auxiliary heater would be surrounded (at least partly) by air when all, or nearly all of the hot water has been drawn off, thereby causing this heater to burn out unless it was so constructed as to be undesirably slow in its heating action.

My present invention aims to obviate all of the just recited shortcomings by simple means applicable also to other types of liquid heaters, without involving either complications or a material increase in the cost of the liquid heating appliance.

Illustrative of the manner in which I accomplish the above recited objects, and also of further and more detailed objects, Fig. 1 is a central and vertical section through a liquid heating appliance embodying my invention, with a portion of the electromagnetic control valve broken away and with the circuit connections omitted.

Fig. 2 is a fragmentary vertical section taken at right angles to the plane of Fig. 1, namely along the line 2—2 of that figure.

Fig. 3 is a fragmentary perspective view of the lower portion of the riser duct within which the liquid is heated.

Fig. 4 is an enlarged horizontal section taken along the line 4—4 of Fig. 1.

Fig. 5 is an enlarged and fragmentary vertical section taken along the line 5—5 in either Fig. 1 or Fig. 4.

Fig. 6 is a vertical section allied to a portion of Fig. 1, showing the upper portion of a different type of heating member and the parts adjacent thereto.

Fig. 7 is an enlarged horizontal section, taken along the line 7—7 of Fig. 6.

Fig. 8 is a fragmentary and enlarged vertical section taken along the line 8—8 of Fig. 4 through the auxiliary heater and parts associated with it, the thermostatic control member being shown diagrammatically.

Fig. 9 is a diagram of the circuit connections within the appliance.

In the drawings, Fig. 1 shows a liquid heater which includes a central riser duct (generally designated as 1) extending upwardly within a container which includes a receptacle portion having a riser wall 2 and a cover 3; each of these container parts having double walls spaced by heat-insulating material 4. Water is admitted under pressure to the interior of the said riser duct from a water pipe 5 through a port 6 in a plug P upon which the riser tube is socketed, the flow of water through this pipe being controlled by an electromagnetic valve 7 after the manner described in my copending application #600,877.

While flowing upwardly within the riser duct, the water is heated in an electric heating member 8, here shown as of an inverted U-shape and with its upper end spaced considerably downwardly from the upper end of the riser duct. With this heating member of a suitable capacity, the water is continually boiled before emission from the said duct, and the vapor produced during the boiling is condensed within the upper part of the container to form a supply of stored hot water W disposed in the annular compartment between the riser duct and the riser wall 2 of the receptacle.

Hot water can be drawn from this supply through an outlet 9 which is adjacent to the bottom of the receptacle so as to allow substantially all of the hot water to be drawn off, if needed, through a faucet 10 connected to the said outlet. An annular float F which extends freely around the riser duct is connected by a suitable mechanism (including links 11 and 12 and an interposed lever 13) to a switch S which controls the supply of current to both the electric heating member 8 and the electromagnetic valve 7, the assembly being arranged after the manner of my said copending application so that both the supply of water to the riser tube and the supply of current to the heating member are limited to the periods needed for restoring the level L of the hot water W to its normal height after each withdrawal of part of this hot water.

The extreme lower end portion of the riser duct desirably has a cylindrical bore, so that it can be socketed upon the cylindrical upper end of the plug P, and the upper end of the riser duct preferably has a bore of circular section so as to expose a considerable area of water at the top of the column of water in this tube. However, the intermediate part 1A of the riser duct, which part houses the heating member, is contracted in diameter in a direction at right angles to the common plane of the axis of the two shanks of the inverted U-shaped heating member, as shown in Figs. 2 and 4.

To permit this in an easily manufactured construction, I desirably form the riser duct of a flattened tubular main part 1A fastened at its lower end into a similarly shaped upper sleeve portion 14 which forms an extension of a cap-like lower duct portion 1B socketed on the plug P as shown in Fig. 3. Then I provide the upper (or evaporator cup) portion 1C of the riser duct with a downward tubular extension 15, formed similar to the sleeve portion 14 of the lower part, which extension 15 is sleeved upon and fastened to the upper end of the main riser duct part 1A, as shown in Figs. 1 and 2. The main tubular part may easily be cut off a flattened tubing.

The extent to which this main riser tube part is flattened is desirably such that the tube presents two flat and parallel walls connected by two arcuate wall portions, as shown in Figs. 4 and 5, which figures also show the decided reduction in the cross-sectional area of the bore of this tube from what it would be if cylindrical and of the same diameter as the major diameter of the flattened tube, as indicated by the dotted line 16.

Owing to this reduction in the cross-section of the main portion of the riser duct, the cross-sectional area of the water around and between the shanks of the heating member is greatly reduced, so that the heating effect of that member on the water flowing past it is concentrated on a relatively much smaller volume of water. Consequently, vapor bubbles will form in portions of the water far below the midheight of the riser tube, so that I can obtain a more rapid boiling of the water than is possible with the same heating member disposed in a tube of cylindrical bore.

In practice, the two shanks of the heating member may advantageously be spaced considerably farther from each other than the spacing of each shank from the adjacent arcuate edge portion of the riser tube, as shown in Fig. 4, because the vapor bubbles formed along the opposed edges of the two shanks agitate the water disposed between the said shank and aid in heating that portion of the water. Moreover, when the upper end of the heating member is spaced considerably downward from the upper end of the riser tube (or from the mouth end of the part 1C which forms the evaporator cup) the vapor bubbles will readily distribute within this cup, so that the entire exposed surface of the heater water shows continually bursting vapor bubbles when the heating member is operating.

Since the upper or main part 1C of this evaporator cup is of a cylindrical bore, desirably of a diameter at least as great as the major diameter of the flattened riser tube part 1A, and since this evaporator cup houses no portion of the heating member, this cup also has a large liquid-storing capacity in proportion to the lower portions of the riser duct. Consequently, whenever the float is raised sufficiently to shut off both the flow of water and the operation of the heating member, this evaporator cup stores a quantity of highly heated water which is much larger, in proportion to the only partly heated water in lower parts of the riser tube, than it would be with an entirely cylindrical riser tube as shown in my said copending application. This storing of a relatively large quantity of water (at a temperature close to its boiling point) in the upper part of the riser tube also enables each restarting of the heating action to start an evaporation of water from the riser tube much more speedily than would be the case in a simple cylindrical riser tube such as that shown in my said copending application.

In addition to enhancing the responsiveness of my liquid heater, the flattening of the major portion of the riser duct also greatly reduces the volume of cool water which is left within this tube whenever the flow of water and of heating current are discontinued. Consequently, the exchange of heat between the hot water supply W and the water within the riser tube during the idle periods of my appliance is also greatly reduced, so that there is less diminution in the temperature of the available hot water supply during these idle periods.

To compensate for even this reduced cooling of the hot water supply by the said interchange of heat, and for the additional cooling due to heat radiation through the receptacle riser wall 2 during the idle periods of my appliance, I dispose an auxiliary heating member 17 within the stored hot water W. The auxiliary heating member is preferably disposed in the lower and hence coolest portion of the stored hot water, or laterally opposite the least warmed water in the lower portion of the riser tube, and desirably is a cartridge type of heater extending upwardly through a bore 18 in the bottom 19 of the container of my appliance.

This auxiliary heater is connected to the supply circuit wires E (Fig. 8) independent of the connections to the main heating member 8 and the electromagnetic water flow control valve 7, but through a thermostatic switch T, shown diagrammatically in Fig. 8, which switch will close the auxiliary heater circuit only when the temperature of the lower part of the stored hot water W (in which the auxiliary heater is disposed) is below a certain minimum, and which switch will open when it has raised the water to the temperature for which the thermostatic switch is adjusted.

In practice, the auxiliary heating member 17 can be of quite small capacity in proportion to that of the main heating member 18; and with the thermostatic switch suitably adjusted, the temperature of the stored hot water can readily be kept substantially constant even with long intervals between the times when hot water is drawn off.

However, when an auxiliary or temperature-maintaining heating member is employed in the lowermost portion of a water chamber which discharges from near its bottom, the following difficulties are encountered:

The commercially available low wattage heaters suitable for this purpose are commonly designed for continuous immersion in the liquid which is to be heated and are not constructed so as to stand the much higher temperatures which they would generate if a surrounding liquid did not continuously absorb and carry off the heat. Consequently, if the demands for hot liquid are such that the hot-water storing chamber is completely emptied, or even to an intermediate point in which only part of the heating member projects out of the liquid, the poor conductivity of the air which then surrounds part or all of this member will cause the latter to burn out, this being particularly true when such heating members are designed for rapid heat radiation and speedy action.

Moreover, the lower priced cartridge type heaters also are commonly constructed so that their casings do not afford completely water-tight enclosures, thereby presenting the further risk that the entrance of liquid into the casings will short-circuit part or all of the heating element and cause the latter to burn out.

To avoid such a destruction, or at least damaging, of the auxiliary heating member by the effect of admitted liquid or whenever the level of the stored hot liquid falls below the top of that member, I provide an arrangement whereby the auxiliary heating member continues to be in direct heat-conducting relation to liquid after the hot water supply has been drained out of my liquid heater, for a period of time sufficient to allow the appliance to replenish the stored hot water so that this again has its level above the top of the auxiliary heating member.

Illustrative of such a heater protection and also of a desirable method of supporting such a heater when of the inexpensive cartridge type which does not have a watertight housing, Fig. 8 shows the use of a two-part protector for this purpose. The stationary part of this protector comprises an upright metal tube 20 having a closed upper end 21 and having its bore of such a size that a standard cartridge type electric heating member 17 can be slid up into and wedged tightly in it. The lower end portion of the tube 20 is flared out to form an annular flat foot 22 which can be welded or brazed to the bottom 19 of the container when the tube alines with the bottom bore 18 through which the heating member extends.

Housing the tube 20, and preferably concentric with the latter, is a larger diametered outer metal tube 23 which extends considerably higher than the top of the tube 20. To center the outer tube, I desirably provide the inner part of my protective device with an inverted cup-shaped portion 24 adjacent to the foot flange 22, this cup-shaped portion having a cylindrical riser wall upon which the outer tube 23 is snugly sleeved. To add firmness to the supporting of the outer tube, I also desirably provide this at its lower end with a radial flange 25 which seats on the foot flange 22 of the inner tube, thereby securing a rigid mounting of the outer tube while making the bore of the latter tube of such diameter that it still can be manually pulled off the riser wall of the cup-shaped part of the inner tube.

Since the heater-housing tube 23 is open at the top, this tube will be filled with hot water as soon as the stored hot water W initially extends above the top of the tube; and whenever thermostatic switch T is closed, the heating action of the auxiliary heater 23 will be transmitted to this stored water partly by convection and partly by radiation through the water in the tube 23 and through the metal of that tube.

When hot water is drawn off to such an extent that the water level falls below the top of the heater-housing tube 23, this tube will still continue to store water—as shown for example in Fig. 8—and the effect of this water-jacketing will suffice to prevent the heating member 17 from burning out so long as any material quantity of water remains in the said tube. Consequently, with the liquid capacity of this tube suitably proportioned to the water-evaporating capacity of the auxiliary heating member 17, this water-jacketing will prevent the latter member from burning out during the time in which freshly heated water is collected within the water-storing chamber to a level above the top of the tube 23 so as to refill that tube to its top with hot water.

By employing this safety provision, I am able to prevent the heretofore encountered deterioration and even complete operative destruction of such an auxiliary heater while permitting the entire stored supply of hot water to be drawn off when necessary. By socketing the auxiliary heating member 17 in a tube 20 which is closed at its upper end, I prevent a direct contact of the water with this member, thereby permitting the use of a cheap cartridge type of electric heating member having a casing which is not watertight. Moreover, this auxiliary heating member can instantly be inserted within, or withdrawn from, the inner tube 20, and the welding of the foot flange 22 to the container bottom 19 affords a seal so that no packing is required between the auxiliary member and the said bottom.

However, while I have described the use of my partially flattened efficiency-increasing tube and of my safeguarded temperature-maintaining auxiliary heater in connection with a liquid heater of the general type disclosed in my copending application, I do not wish to be limited to the conjoint use of the novel features of my invention nor to their use in connection with liquid heaters of any particular type. Nor do I wish to be limited to the heretofore disclosed details of construction and arrangement, since many changes might obviously be made without departing either from the spirit of my invention or from the appended claims.

I claim as my invention:

1. A liquid heater comprising a receptacle including a bottom element having its upper portion of an upright cylindrical contour and having an upwardly opening liquid passage extending through it; an upright duct having a cylindrical tubular lower end snugly socketed upon the said cylindrically contoured bottom portion and having an upper portion of cylindrical contour, the duct having an intermediate portion of flattened oval section and of considerably greater length than the said upper portion; and an electric heating member supported by the said bottom element and extending within the intermediate duct portion for substantially the entire height of that duct portion, the heating element in plan view presenting a contour extending substantially parallel to and spaced from the bore of the said intermediate portion of the duct.

2. A liquid heater comprising a receptacle including a bottom element having its upper portion of an upright cylindrical contour and having an upwardly opening liquid passage extending through it, a lower tubular element comprising a cap fitted upon the cylindrically contoured bottom portion and a collar extending upwardly from the said cap, an upper tubular element comprising a cup and a collar extending downwardly from the bottom of the cup, the collars of the said two elements having counterpart bores of a flattened oval cross-section, and a tube of flattened oval cross-section having its end portions respectively fitted into the said collars; and a heating member supported by the said bottom element and extending upwardly within the said tube, the heating member being freely spaced from the bore of the tube and having upright surface portions at substantially uniform spacing from the bore of the tube.

3. In a liquid heater, a receptacle through the bottom of which liquid is admitted under pressure, an inverted U-shaped heating member supported within the receptacle and having its U-back spaced downwardly from the upper end of the receptacle; the part of the riser wall of the receptacle which houses the heating member being flattened transversely of the common plane of the axes of the shanks of the U-shaped heating member, and the part of the said riser wall above the heating member having in all radial directions a minimum diameter not less than the major bore diameter of the said flattened riser wall portion.

4. A liquid heater as per claim 3, in which the last named part of the riser wall of the receptacle is of greater height than the major diameter of the flattened portion of the riser wall.

5. A liquid heater as per claim 3, in which the extent of the said flattening of a part of the first named riser wall of the receptacle is such that the bore of this riser wall part presents flat opposite flat faces connected to each other by arcuate face portions each of which is concentric with the axis of one shank of the U-shaped heating member.

6. In a liquid heater, a receptacle through the bottom of which liquid is admitted under pressure, an inverted U-shaped heating member supported within the receptacle and having its U-back spaced downwardly from the upper end of the receptacle; the part of the riser wall of the receptacle which houses the heating member being flattened transversely of the common plane of the axes of the shanks of the U-shaped heating member, and the part of the said riser wall above the heating member having in all radial directions a minimum diameter not less than the major bore diameter of the said flattened riser wall portion, the spacing of each of the said shanks from the adjacent arcuate face portion being less than the radius of the shank.

7. In a liquid heater, a receptacle through the bottom of which liquid is admitted under pressure; the riser wall of the receptacle including an upper cylindrically tubular portion and a relatively longer main portion of a flattened oval bore section having its major diameter not greater than the diameter of the said upper portion; and an electric heating member supported within the receptacle and including a heating element disposed entirely within the flattened portion of the receptacle, the heating member being of a relatively thin and wide general sectional contour having its major spread at right angles to the vertical plane along which the longer portion of the said riser wall is flattened.

8. In an electrically operated liquid heater, an upright container, a plug extending through the bottom of the container and presenting a cylindrical upper portion within the container, the plug having a liquid passage opening through the top of the said portion; a riser tube comprising in rigid connection a cylindrical lower end portion firmly socketed on the said cylindrical plug portion, a cylindrical upper end portion, and an interposed portion of flattened oval section and of greater length than the said upper end portion; and a heating member supported by the plug and including a heating element housed entirely by the flattened portion of the riser tube; the heating member being of less spread in the direction which the tube is flattened than in a direction at right angles thereto, and all portions of the heating member being freely spaced from the bore of the said flattened tube portion.

9. In an electrically operated liquid heater, an upright container, a smaller diametered upright tube extending upwardly from the bottom of the container in freely spaced relation to the riser wall of the container, the container bottom having a passage for admitting liquid into the lower portion of the said tube and the container having a discharge outlet disposed radially outward of the tube and near the bottom of the container; a main electric heating member disposed within the said tube; an auxiliary electric heating member disposed within the lower portion of the container radially outward of the said tube; means responsive to the level of liquid in the container outward of the said tube for controlling the operation of the main electric heating member, and means independent of the aforesaid means and responsive to the temperature of liquid adjacent to the auxiliary heating member for controlling the operation of the latter member.

10. In a liquid heater, an upright and upwardly open tube within which liquid flows upwardly; the tube comprising an upper and interiorly unobstructed part having a bore of circular section, and a relatively longer lower part of flattened oval section of less cross-sectional area than the upper tube part; and an electric heating member disposed entirely within the said longer tube part; the heating member presenting two upright shanks having their common axes in the same vertical plane with the longer axis of the said oval section of the longer tube part, and the heating member having all parts thereof housed by and spaced from the bore of the said longer tube part.

11. In a liquid heater, an upright tube within which liquid flows upwardly, and an electric heating member of inverted U-shape freely housed by the tube and having its upper end spaced downwardly from the upper end of the tube, the part of the tube housing the heating member being flattened so as to present flat bore wall portions parallel to the common plane of the shanks of the axis of the shanks of the inverted U-shaped heating member, and the tube including an upper and interiorly unobstructed end portion having a cylindrical bore of a diameter not less than the major width of the aforesaid bore part.

12. In a liquid heater, the combination with a liquid storing container provided in its lower portion with an outlet through which the heated liquid is normally withdrawn, and having the bottom of the container provided with a perforation, of means for maintaining the temperature of the stored liquid; the said means comprising an inverted and imperforate cup-shaped member overlying the perforation and sealed at its lower end to the said bottom; a heating member disposed within the said member; and a laterally imperforate tube freely housing the said member and extending higher than both the said member and the discharge outlet, the tube being sealed at its lower end to the said chamber bottom and having its upper end freely open.

13. In a liquid heater, the combination with a hot-liquid storing container provided in its lower portion with an outlet through which the heated liquid is normally withdrawn, and having the bottom of the container provided with a perforation, of means for maintaining the temperature of the stored liquid, the said means comprising an upright thimble-like upwardly closed and laterally imperforate member overlying the perforation and sealed at its lower end to the said bottom; a heating member disposed within and in heat-conducting relation to the said thimble-like member; and an upright tube freely housing the thimble-like member and extending higher than both the said member and the said outlet and freely open at its upper end; the said member including a diametrically enlarged part disposed above and near the bottom of the container, upon which part the lower end of the said tube is tightly sleeved so as to seal the tube effectively to the lower portion of the thimble-like member.

14. In an electric heater, a hot-liquid storing container provided near its bottom with an outlet through which stored hot liquid can be discharged, of temperature maintaining means comprising an upright electric heating member supported in the lower portion of the container; an upright tube freely housing the heating member and open only at its upper end, the tube having its upper end disposed at higher elevation than both the top of the heating member and the said outlet; means for supplying hot liquid for storage in the container, and means including a float buoyed up by hot liquid stored in the container for controlling the said supply of liquid so as to maintain the level of the stored liquid normally at a height considerably above the upper end of the said tube.

15. A liquid heater of the class described, comprising a liquid container, a main heating member associated with the container for heating the liquid, partitioning means dividing the lower portion of the interior of the container into a chamber housing the main heating member and a hot-liquid storing chamber; the container having its normal discharge outlet near its bottom and connected to the hot-liquid storing chamber, and having an aperture in the portion of the container bottom underhanging the last named chamber; a thimble-like metallic holder overlying the aperture and sealed at its lower end to the said bottom and extending to a higher elevation than the uppermost portion of the said outlet; a heating member detachably socketed in the said holder; a tube freely surrounding the said holder and having its upper end open and disposed at higher elevation than the upper end of the said holder, the tube having its lower end portion sealed to the holder; and means associated with the container for supplying hot liquid to the container and for normally maintaining the level of this liquid at considerably greater elevation than the top of the said tube.

LEE B. GREEN.